(12) United States Patent
Rabii

(10) Patent No.: US 8,699,582 B2
(45) Date of Patent: Apr. 15, 2014

(54) CONTEXT-BASED ADAPTATIONS OF VIDEO DECODER

(75) Inventor: Khosro M Rabii, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 718 days.

(21) Appl. No.: 12/899,039

(22) Filed: Oct. 6, 2010

(65) Prior Publication Data
US 2012/0087415 A1 Apr. 12, 2012

(51) Int. Cl.
*H04B 1/66* (2006.01)

(52) U.S. Cl.
USPC ............ 375/240.25; 375/240.26; 375/240.02; 375/240.01; 382/233; 382/235; 382/239

(58) Field of Classification Search
USPC ............. 375/240.25, 240.26, 240.02, 240.01; 382/233, 235, 239
See application file for complete search history.

(56) References Cited

U.S. PATENT DOCUMENTS

| | | | | |
|---|---|---|---|---|
| 5,815,206 | A * | 9/1998 | Malladi et al. ............ | 375/240.01 |
| 5,990,958 | A * | 11/1999 | Bheda et al. ............... | 348/407.1 |
| 6,925,126 | B2 * | 8/2005 | Lan et al. .................. | 375/240.25 |
| 2004/0049672 | A1 | 3/2004 | Nollet et al. | |
| 2005/0094729 | A1 * | 5/2005 | Yuan et al. ............... | 375/240.16 |
| 2009/0322764 | A1 * | 12/2009 | Saini et al. ..................... | 345/501 |
| 2012/0057637 | A1 * | 3/2012 | Flachs et al. ............. | 375/240.25 |

OTHER PUBLICATIONS

Kalavade et al., "Hardware/Software Partitioning for Multi-function Systems," IEEE, 1997, pp. 516-521.
International Search Report and Written Opinion—PCT/US2011/055148—ISA/EPO—Nov. 28, 2012.
Mignolet, "Enabling Hardware-Software Multitasking on a Reconfigurable Computing Platform for Networked Portable Multimedia Appliances", Jun. 1, 2002, pp. 1-7, XP55043933, Retrieved from the Internet: URL:http://reference.kfupm.edu.sa/content/ e/n/ enabling_hardware_soltware_multitasking_82764.pdf [retrieved on Nov. 12, 2012].

* cited by examiner

*Primary Examiner* — Shawn An
(74) *Attorney, Agent, or Firm* — Campbell C. Chiang; Elaine H. Lo

(57) ABSTRACT

A receive device receives video data in the form of an encoded video bit stream. A video decoder of the receive device identifies a portion of the video data corresponding to a first scene and determines a complexity for this first scene and also determines a quality of service for the receive device. If the complexity of the first portion of video data is greater than a complexity threshold value or the quality of service is less than a quality of service threshold value, then the video decoder uses a hardware accelerator to decode the portion of video data. If, however, the complexity of the portion of video data is less than the complexity threshold value and the quality of service is greater than the quality of service threshold value, then the video decoder may use software decoding to decode the portion of video data.

28 Claims, 5 Drawing Sheets

CONTEXT-BASED ADAPTATIONS OF VIDEO DECODER

TECHNICAL FIELD

Aspects of this disclosure relate generally to video coding and, more particularly, to a system and method for performing both hardware-based decoding and software-based decoding.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, tablet computers, digital cameras, digital recording devices, video gaming devices, video game consoles, personal multimedia players, and the like. Such video devices may implement video compression techniques, such as those described in MPEG-2, MPEG-4, or ITU-T H.264/MPEG-4, Part 10, Advanced Video Coding (AVC), in order compress video data. Video compression techniques perform spatial and temporal prediction to reduce or remove redundancy inherent in video sequences. New standards, such as the ITU-T H.265 standard continue to emerge and evolve.

In video coding, video compression generally includes spatial prediction, motion estimation, and motion compensation. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching video blocks between two or more adjacent frames. Motion estimation generates motion vectors, which indicate the displacement of video blocks relative to corresponding video blocks in one or more reference frames. Motion compensation uses the motion vector to generate a prediction video block from a reference frame. After motion compensation, a residual video block is formed by subtracting the prediction video block from the original video block.

The video encoder applies transform, quantization, and entropy coding processes to further reduce the bit rate of the residual block. Entropy coding generally involves the application of arithmetic codes or variable length codes (VLCs) to further compress residual coefficients produced by the transform and quantization operations. Examples include context-adaptive binary arithmetic coding (CABAC) and context-adaptive variable length coding (CAVLC), which may be used as alternative entropy coding modes in some encoders. A video decoder performs inverse operations to reconstruct the encoded video, using the motion information and residual information for each of the blocks.

SUMMARY

Aspects of this disclosure include a video decoder configured to perform certain video decoding operations by means of both software-based video decoding and hardware-based video decoding. Hardware-based video decoding generally includes the use of one or more dedicated hardware units, which collectively may be referred to as a hardware accelerator or hardware processing unit, for performing video decoding operations. Software-based video decoding, in contrast, generally relies on a software program being executed by a device's general purpose processor or an application processor to perform video decoding operations. Software-based video decoding, especially prolonged periods of software-only video decoding, may improve the battery life of a video decoding device relative to techniques that utilize a hardware accelerator. Depending on the video data being decoded and other device constraints, however, there are times when hardware-based video decoding might be preferred or even necessary to achieve acceptable device performance.

Aspects of the present disclosure include a system and method for dynamically alternating between hardware-based video decoding and software-based video decoding. These techniques may prolong the battery life of a video decoding device without degrading overall performance of the device. During playback of video, a device might alternate many times between performing certain video decoding operations in hardware and performing those same operations in software, but this alternating in the decoding mechanism used may not be apparent to a viewer of the video other than in the form of prolonged battery life.

In one example, a method comprises receiving at a video decoding device, video data to be decoded; identifying within the video data, a first subset of the video data corresponding to a first scene; determining a complexity of the first subset of video data; monitoring a quality of service for the video decoding device; using software decoding to decode the first subset of video data in response to the complexity of the first subset of video data being less than a complexity threshold value and the quality of service being greater than a quality of service threshold value; and using a hardware processing unit to decode the first subset of video data in response to the complexity of the first subset of video data being greater than the complexity threshold value or the quality of service being less than a quality of service threshold value.

In another example, a video decoding apparatus comprises a scene identifying unit configured to identify within video data a scene corresponding to a subset of the video data; a complexity analyzing unit configured to determine a complexity of the scene; a quality of service monitoring unit configured to monitor a quality of service for the video decoding apparatus; a software processing module configured to decode the subset of video data; a hardware processing unit configured to decode the subset of vide data; a hardware-software decider configured to cause the subset of video data to be decoded using the software processing module in response to the complexity of the first subset of video data being less than a complexity threshold value and the quality of service being greater than a quality of service threshold value, and cause the subset of video data to be decoded using the hardware processing unit in response to the complexity of the first subset of video data being greater than the complexity threshold value or the quality of service being less than a quality of service threshold value.

In another example, a computer-readable storage medium comprises instructions that upon execution by a processor cause the processor to receive, at a video decoding device, video data to be decoded; identify within the video data, a first subset of the video data corresponding to a first scene; determine a complexity of the first subset of video data; monitor a quality of service for the video decoding device; use software decoding to decode the first subset of video data in response to the complexity of the first subset of video data being less than a complexity threshold value and the quality of service being greater than a quality of service threshold value, and to use a hardware processing unit to decode the first subset of video data in response to the complexity of the first subset of video data being greater than the complexity threshold value, or the quality of service being less than a quality of service threshold value.

In another example, a video decoding apparatus comprises: means for identifying within video data to be decoded, a first subset of the video data corresponding to a first scene; means for determining a complexity of the first subset of video data; means for monitoring a quality of service for the video decoding device; means for causing software decoding to decode the first subset of video data in response to the complexity of the first subset of video data being less than a complexity threshold value and the quality of service being greater than a quality of service threshold value; means for causing a hardware processing unit to decode the first subset of video data in response to the complexity of the first subset of video data being greater than the complexity threshold value or the quality of service being less than a quality of service threshold value.

For the examples above, the complexity threshold value can be based at least in part on the rate at which a battery of the video decoding device is discharging. The complexity of the first subset of video data can be based at least in part on any combination of a bit rate of the first subset of video data, a frame rate of the first subset of video data, a spatial size of the first subset of video data, a bit stream rate variability of the first subset of video data. The quality of service can be a measurement of performance of the video decoding device.

The details of one or more aspects of the techniques described in this disclosure are set forth in the accompanying drawings and the description below. Other features, objects, and advantages of the techniques described in this disclosure will be apparent from the description and drawings, and from the claims.

DETAILED DESCRIPTION

Aspects of this disclosure include a video decoder configured to perform certain video decoding operations via both software-based decoding and hardware-based decoding. Hardware-based decoding generally includes the use of one or more dedicated hardware units, which collectively may be referred to as a hardware accelerator or hardware processing unit, for performing decoding operations. Software-based decoding, in contrast, generally relies on a software program running on a device's general purpose processor or application processor to perform decoding operations. Software-based decoding, especially prolonged periods of software-only decoding, may improve the battery life of a decoding device relative to techniques that exclusively utilize a hardware accelerator. Depending on the video data being decoded and other device constraints, however, there are times when hardware-based video decoding might be preferred or even necessary to achieve acceptable device performance. Aspects of this disclosure include a system and method for dynamically alternating between hardware-based video decoding and software-based video decoding. These techniques may prolong the battery life of a video decoding device without degrading overall performance of the device.

Figure 1:
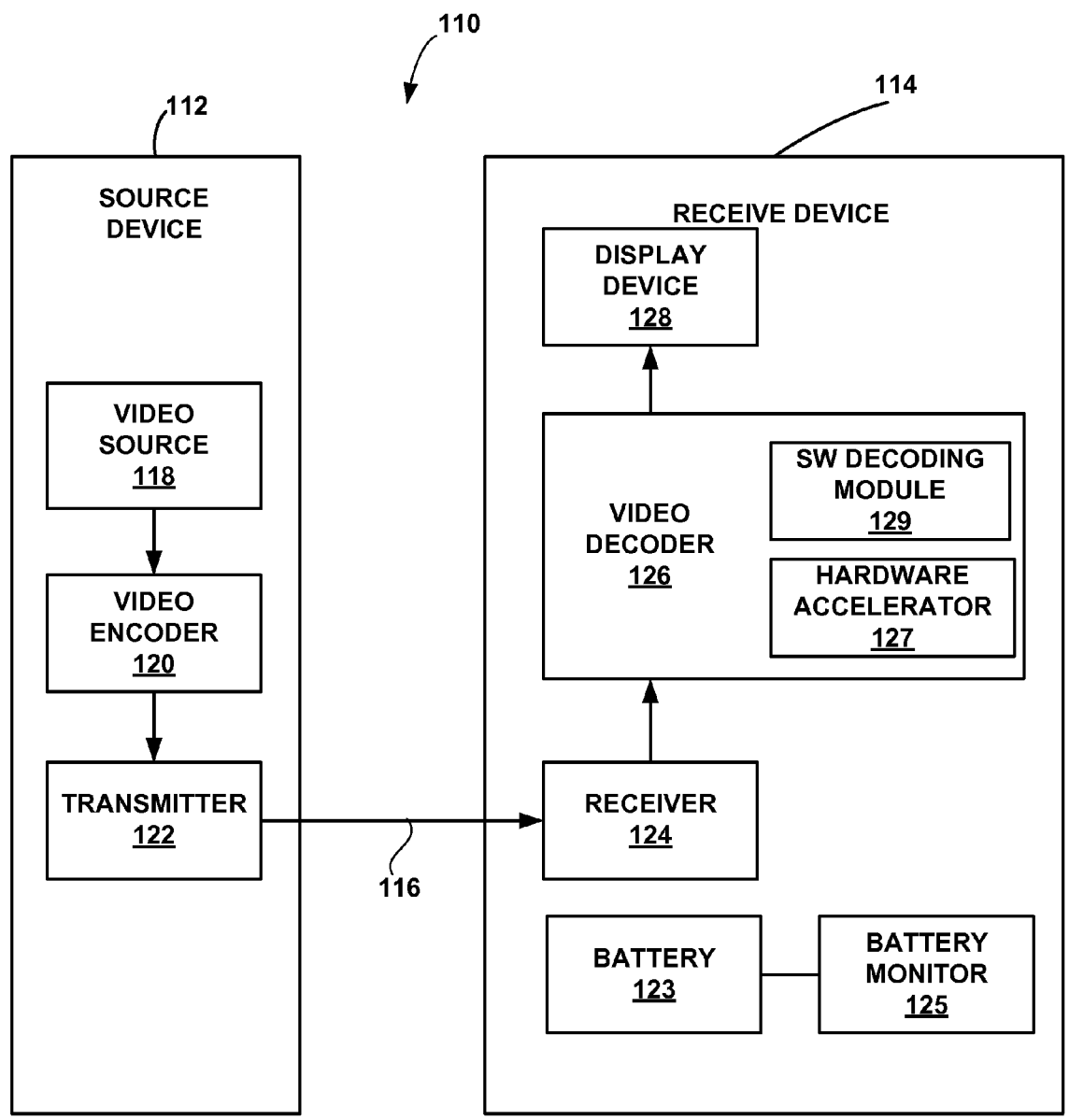
FIG. 1 is a block diagram illustrating a video encoding and decoding system that implements various aspects of this disclosure.

FIG. 1 is a block diagram illustrating a video encoding and decoding system 110. As shown in FIG. 1, system 110 includes a source device 112 that transmits encoded video to a receive device 114 via a communication channel 116. Source device 112 may include a video source 118, video encoder 120 and a transmitter 122. Receive device 114 may include a receiver 124, video decoder 126, and video display device 128. In the example of FIG. 1, receive device 114 includes a battery 123 and a battery monitor 125 for monitoring a charge level of battery 123, but aspects of the present disclosure may also be implemented in devices without batteries. System 110 may be configured to implement aspects of the various techniques described in this disclosure.

Receive device 114 may take the form of a portable, dedicated video player configured to receive video data according to a forward-link only (FLO) standard such as MediaFLO®, a standard from the Digital Video Broadcasting (DVB) family of standards, a standard from the Advanced Television Systems Committee (ATSC) family of standards, a standard from the Integrated Services Digital Broadcasting (ISDB) family of standards, a standard from the Motion Pictures Expert Group (MPEG) family of standards, or various other standards. Receive device 114 may also be configured to read video data from a storage medium such as hard drive, digital video disc (DVD), or BluRay® disc. Receive device 114 may also be incorporated into a multi-purpose device such as a smartphone, notebook computer, or tablet computer that is configured to receive video data while executing other applications. Aspects of this disclosure may be incorporated into numerous different types of devices and may be of particular benefit to devices with limited resources such as limited battery charge, limited interface bandwidth, or limited memory throughput.

Video encoder 120 and video decoder 126 may operate according to a video compression standard, such as MPEG-2, MPEG-4, ITU-T H.263, ITU-T H.264/MPEG-4 Advanced Video Coding (AVC), or the emerging ITU-T H.265 standard. Video encoder 120 and video decoder 126 may also operate according to next generation video coding standards such as ITU-T H.265, as the techniques of this disclosure are not limited to a specific video coding standard or scheme.

In the example of FIG. 1, communication channel 116 may comprise any wireless or wired communication medium, such as a radio frequency (RF) spectrum or one or more physical transmission lines, or any combination of wireless and wired media. Channel 116 may form part of a packet-based network, such as a local area network, wide-area network, or a global network such as the Internet. Communication channel 116 generally represents any suitable communication medium, or collection of different communication media, for transmitting video data from source device 112 to receive device 114.

Source device 112 generates video for transmission to receive device 114. In some cases, however, devices 112, 114 may operate in a substantially symmetrical manner. For example, each of devices 112, 114 may include video encoding and decoding components. Hence, system 110 may support one-way or two-way video transmission between video devices 112, 114, e.g., for video streaming, video broadcasting, or video telephony.

Video source 118 may include a video capture device, such as one or more video cameras, a video archive containing previously captured video, or a live video feed from a video content provider. As a further alternative, video source 118 may generate computer graphics-based data as the source video, or a combination of live video and computer-generated video. In some cases, if video source 118 is a camera, source device 112 and receive device 114 may form so-called camera phones or video phones. In each case, the captured, pre-captured or computer-generated video may be encoded by video encoder 120 for transmission from video source device 112 to video decoder 126 of video receive device 114 via transmitter 122, channel 116 and receiver 124. Display device 128 may include any of a variety of display devices such as a liquid crystal display (LCD), plasma display or organic light emitting diode (OLED) display.

Video encoder 120 and video decoder 126 may be configured to support scalable video coding for spatial, temporal and/or signal-to-noise ratio (SNR) scalability. In some aspects, video encoder 120 and video decoder 126 may be configured to support fine granularity SNR scalability (FGS) coding for SVC. In some examples, encoder 120 and decoder 126 may support various degrees of scalability by supporting encoding, transmission and decoding of a base layer and one or more scalable enhancement layers. For scalable video coding, a base layer carries video data with a minimum level of quality. One or more enhancement layers carry additional bitstream to support higher spatial, temporal and/or SNR levels.

A video sequence includes a series of video frames. Video encoder 120 operates on blocks of pixels within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16×16, 8×8, 4×4 for luma components, and 8×8 for chroma components, as well as inter prediction in various block sizes, such as 16×16, 16×8, 8×16, 8×8, 8×4, 4×8, and 4×4 for luma components and corresponding scaled sizes for chroma components.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. Each slice may be an independently decodable unit. After prediction, a transform may be performed on the 8×8 residual block or 4×4 residual block, and an additional transform may be applied to the DC coefficients of the 4×4 blocks for chroma components or luma component if the intra_16×16 prediction mode is used.

Video encoder 120 and video decoder 126 each may be implemented as one or more microprocessors, digital signal processors (DSPs), application specific integrated circuits (ASICs), field programmable gate arrays (FPGAs), discrete logic, software, hardware, firmware or any combinations thereof. Receive device 114 includes a hardware processing unit 127 (shown on FIG. 1 as "hardware accelerator 127") dedicated to performing specific video decoding operations of video decoder 126. Hardware accelerator 127 may comprise one or more ASICs, special-purpose processors, FPGAs, or any other hardware for performing video decoding operations.

Video decoder 126, however, may be capable of also performing some or all of the video decoding operations performed by hardware accelerator 127 in software, i.e. with software (SW) decoding module 129. Software decoding module 129 represents one or more software processes being maintained by a processor executing instructions. Video decoder 126 dynamically determines whether to use hardware decoding (i.e. use hardware accelerator 127) or software decoding (i.e. use software decoding module 129) based on factors such as complexity of the data to be decoded and on a measure of overall quality of performance being detected for receive device 114.

Each of video encoder 120 and video decoder 126 may be included in one or more encoders or decoders, either of which may be integrated as part of a combined encoder/decoder (CODEC) in a respective mobile device, subscriber device, broadcast device, server, or the like. In addition, source device 112 and receive device 114 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

According to aspects of this disclosure, some or all of the functionality of video decoder 126, an example of which is described in more detail below with respect to FIG. 3, may be performed by both software decoding module 129 or dedicated hardware, such as hardware accelerator 127. While some video decoding systems always perform certain types of video decoding operations in software and always perform other types of video decoding operations in hardware, aspects of this disclosure include dynamically determining whether to perform a particular video decoding operation for a portion of video data in software or hardware based on factors such as the complexity of the video data and a measure of the quality of service being detected for receive device 114. During the course of displaying video, such as a television show or a movie, receive device 114 might alternate many times between performing certain video decoding operations in hardware and performing those same operations in software, but this alternating in the decoding mechanism used may not be apparent to a viewer of the video other than in the form of prolonged battery life.

Receive device 114 receives video data in the form of an encoded video bit stream over channel 116. Video decoder 126 identifies a portion of the video data corresponding to a first scene. As will be discussed in more detail below, video decoder 126 determines a complexity for this first scene and also determines a quality of service for receive device 114. If the complexity of the first portion of video data is greater than a complexity threshold value or the quality of service is less than a quality of service threshold value, then video decoder 126 uses hardware accelerator 127 to decode the portion of video data. If, however, the complexity of the portion of video data is less than the complexity threshold value and the quality of service is greater than the quality of service threshold value, then video decoder 126 may use software decoding to decode the portion of video data. When implemented into receive device 114, aspects of this disclosure may result in improved battery life for receive device 114 without degrading the performance of receive device 114.

As used in this disclosure, a scene can be any combination of one or more frames of video data. When possible, scenes are generally identified by video decoder 126 in a manner such that frames within the scene have similar content or characteristics, which decreases the complexity of the scene and thus increases the likelihood of being able to decode the scene using software decoding. In some implementations, such as when receiving an MPEG/JVC compliant bitstream, a scene may be identifiable based on handles or markers included in the bitstream by an encoder. In other implementations, a scene might be identified based on an analysis of the bitstream by video decoder 126. For example, when a television show switches from the television show to a commercial, a scene change might be identified with the last frame of the show ending a first scene and the first frame of the commercial beginning a second scene. The scene change might, for example, be identified by detecting a rapid change in the bit rate of video data received in the bitstream or based on information contained in a sequence header or frame header. Scene changes may also be identified within a television show or within a commercial and not just at the transition from one to the other.

Depending on device constraints such as buffer sizes as well as implementation preferences, scenes might be limited to a minimum number of frames or maximum number of frames. A scene may be identified based on sequences or groups of pictures designations known to video encoder 120 and video decoder 126, but a scene might also be identified independently of sequences and group of pictures designations known to video encoder 120 and video decoder 126.

Aspects of this disclosure include determining a complexity of a scene based on one or more characteristics of the video data of the scene. Examples of such characteristics include a bit rate of the video data, a frame rate of the video data, a spatial size of frames in the video data, and a bit stream rate variability of the video data. The complexity, as determined by video decoder 126, may be based on any of these characteristics or a combination of these characteristics. The complexity of video data generally correlates to the workload, as measured in a number of operations, amount of resources, time, processor utilization, or some other metric, required to decode the video data. More complex video data generally creates a greater workload for system resources than less complex video data and is therefore more likely to require hardware decoding.

The bit rate of video data refers to the number of bits of video data received per unit of time of video, with a higher bit rate generally indicating a higher degree of complexity than a lower bit rate. For example, high definition video might have a bit rate of 40 MB/second while a low resolution video has a bit rate of 256 KB/second. Thus, video decoder 126 might identify the high definition video as having a greater complexity than the low resolution video.

The frame rate of the video data generally refers to the number of frames per unit time of video, with a higher frame rate generally indicating a higher degree of complexity than a lower frame rate. For example, video decoder 126 will identify video data with a frame rate of 60 frames per second as having a greater complexity than video data with a frame rate of 24 frames per second.

Spatial size of the video data generally refers to the number of pixels in a frame. For example, high definition video might have a resolution of 1920×1080 corresponding to 2,073,600 pixels per frame, while standard definition video might have a resolution of 704×480 corresponding to 337,920 pixels per frame. A larger spatial size typically indicates higher complexity. Thus, video decoder 126 might identify the high definition video as having a greater complexity than the standard definition video.

Bit stream rate variability generally refers to how much the bit rate of a video stream varies within a scene. For example, a first portion of video data might have an average bit rate of 2 MB/second that varies between 1.8 MB/second and 2.2 MB/second, while a second portion of video data might have an average bit rate of 1.5 MB/second but vary between 0.5 MB/second and 8 MB/second. Even though the first portion of video data has a higher average bit rate, the second portion of video data has more bit stream rate variability. Higher bit stream rate variability generally indicates more complexity compared to lower bit stream rate variability, and thus, video decoder 126 might identify the video data with the average bit rate of 1.5 MB/second as having a greater complexity than the video data with the average bit rate of 2 MB/second.

The complexity threshold value can be based on a single characteristic of the video data of the scene. For example, a complexity threshold value based on spatial size might be set at 921,600 pixels per frame, which corresponds to the size of a frame of 720P video. Thus, any scene with video that is 720P, 1080P, or otherwise larger than 921,600 pixels per frame has a complexity greater than the complexity threshold value and will be decoded in hardware regardless of the bit rate, frame rate, bit stream rate variability of the data, or other characteristics of the video. As another example, a complexity threshold value based on bit rate might be set at 20 MB/second. Thus, any scene with a bit rate greater than 20 MB/second exceeds the complexity threshold value, and video decoder 126 decodes the video data for the scene in hardware.

The complexity threshold value may also be based on multiple independent characteristics of the video data. For example, a complexity threshold value might be based on a spatial size of 921,600 pixels per frame, a bit rate of 20 MB/second, a frame rate of 40 frames per second, and a bit stream rate variability of 10 MB/second per scene. If any one of the spatial size, bit rate, frame rate, or bit stream rate variability of the scene exceeds one of these values, then the complexity of the scene is greater than the complexity threshold value, and video decoder 126 decodes the video data for the scene in hardware.

The complexity threshold value may also be based on multiple dependent characteristics of the video data. For example, a complexity threshold value might be based on the product of a spatial size and a frame rate, which corresponds to the pixels per second for a particular scene. 720P video, for instance, might not exceed the complexity threshold value at a frame rate of 20 frames per second. Smaller video, however, such as 480P video, might exceed the complexity threshold value at a frame rate of 60 frames per second and thus be decoded in hardware by video decoder 126. In another example of dependant characteristics, a complexity threshold value might be based on an inverse relationship between bit rate and bit stream rate variability. For instance, video data with a high bit rate but low bit stream rate variability might have less complexity than video data with a lower bit rate but larger bit rate variability.

The complexity threshold value might be a function of any combination of single characteristics, multiple independent characteristics, or multiple dependant characteristics. For example, video data with a bit rate greater than 30 MB/seconds might always exceed the complexity threshold value regardless of other characteristics of the video data, while complexity for video data with a bit rate lower than 30 MB/second is a function of both bit rate and bit stream rate variability. Furthermore, complexity thresholds might vary based on the particular coding/decoding scheme utilized for a particular video. For example, a more computationally intensive decoding scheme might utilize a complexity threshold value of 10 MB/seconds while a less computationally intensive decoding scheme might utilize a complexity threshold of 25 MB/second.

According to aspects of this disclosure, complexity threshold values may also vary based on available battery power and battery performance. In general, increasing complexity threshold values leads to more video decoding operations being performed by software decoding module 129, while decreasing complexity threshold values leads to more video decoding being performed by hardware accelerator 127. For example, as the charge level of battery 123 detected by battery monitor 125 drops, video decoder 126 may increase complexity threshold values because with less battery power available, it may be desirable for software decoding module 129 to perform more video decoding operations than hardware accelerator 127 in an attempt to prolong battery life. Additionally, video decoder 126 may adjust complexity threshold values based on battery performance as measured by battery monitor 125, where battery performance refers to the behavior of battery 123 as opposed to a level of charge. For example, if battery monitor 125 detects a rapid average discharge rate, over a period of time, while hardware accelerator 127 is being used, video decoder 126 might increase the complexity threshold values because with rapid discharge, it may be desirable to perform more video decoding operations in software as opposed to hardware. Even if the average discharge rate is not rapid, video decoder 126 might also increase the complexity threshold values in response to battery monitor 125 detecting a high peak-to-average discharge rate, because a higher rate of discharge, even if not for a prolonged period of time, may reduce battery capacity, and thus battery life.

According to aspects of this disclosure, complexity threshold values may also vary based on processor utilization, which generally refers to a processor's actual workload as a percentage of the processor's maximum workload. Processor utilization can be influenced by concurrency, which generally refers to multiple processes being executed simultaneously. For example, if receive device 114 is part of a smartphone that is concurrently downloading files or running other applications while decoding video, then video decoder 126 might lower the complexity threshold values because a general purpose processor in the smartphone can only perform a finite number of operations per second and some of those operations are for processes other than video decoding. Conversely, if video decoding is the only processes being executed by a general purpose processor, then video decoder 126 might increase the complexity threshold values. It has been found, for example, that video graphics array (VGA) video at 640× 480 resolution and wide VGA (WVGA) video at 800×480 resolution can increase a processor's workload, on average, by a factor of four or five compared to quarter VGA (QVGA) video at 320×240 resolution. Despite this increase in workload, however, if decoding of WVGA video is not being performed concurrently with other tasks that are also significantly increasing the workload of the processor, then video decoder 126 might still decode the WVGA video in software.

As used in this disclosure, quality of service generally refers to any measurement of device performance, such as whether or not a video renderer is dropping frames in order to synchronize video with audio or pausing video playback in order to buffer incoming video. Quality of service may also be based on the latency for accessing video data in a buffer or based on the latency for accessing non-video data in a buffer. Quality of service may also be based on regularity with which video source data is accessed, irregularity of video output, and non-synchronization of timestamps between audio and video data. Quality of service may be a measure of a device's performance of video decoding operations, but quality of service can also relate to a device's performance of non-video coding related operations. For example, if a device is adequately decoding video data, but software decoding is slowing the execution of other operations concurrently being executed by the device, then the quality of service for the device may be low, even though video data is being processed adequately.

As used in this disclosure, the quality of service threshold value determines at what point video decoder 126 should enable hardware accelerator 127 based on device performance, regardless of the complexity of video data being decoded. For example, if more than a certain number of frames are dropped per unit time, then the quality of service for a device might be below the quality of service threshold value, causing video decoder 126 to enable hardware accelerator 127, even if the complexity of data to be decoded is less than the complexity threshold value. In another example, if buffer latency is greater than a certain amount of time, then the quality of service for a device might be below the quality of service threshold value causing video decoder 126 to enable hardware accelerator 127, even if the complexity of data to be decoded is less than the complexity threshold value. In another example, if the video source, such as an input bit stream or a stored file, are being accessed at irregular intervals, then the quality of service for a device might be below the quality of service threshold value, causing video decoder 126 to enable hardware accelerator 127, even if the complexity of data to be decoded is less than the complexity threshold value. Similarly, if video output is irregular, often referred to as audio or video jitter, then the quality of service for a device might be below the quality of service threshold value, causing video decoder 126 to enable hardware accelerator 127, even if the complexity of data to be decoded is less than the complexity threshold value. In yet another example, if timestamps for audio and video being output do not correspond, then the quality of service for a device might be below the quality of service threshold value, causing video decoder 126 to enable hardware accelerator 127, even if the complexity of data to be decoded is less than the complexity threshold value.

As with the complexity threshold value discussed above, the quality of service threshold value might also vary based on battery power and battery performance. For example, if battery power is low or battery discharge rate is high, then video decoder 126 might lower the quality of service threshold value to improve battery life. A lower quality of service may be more tolerable when a battery is either low on power or rapidly discharging.

Figure 2:
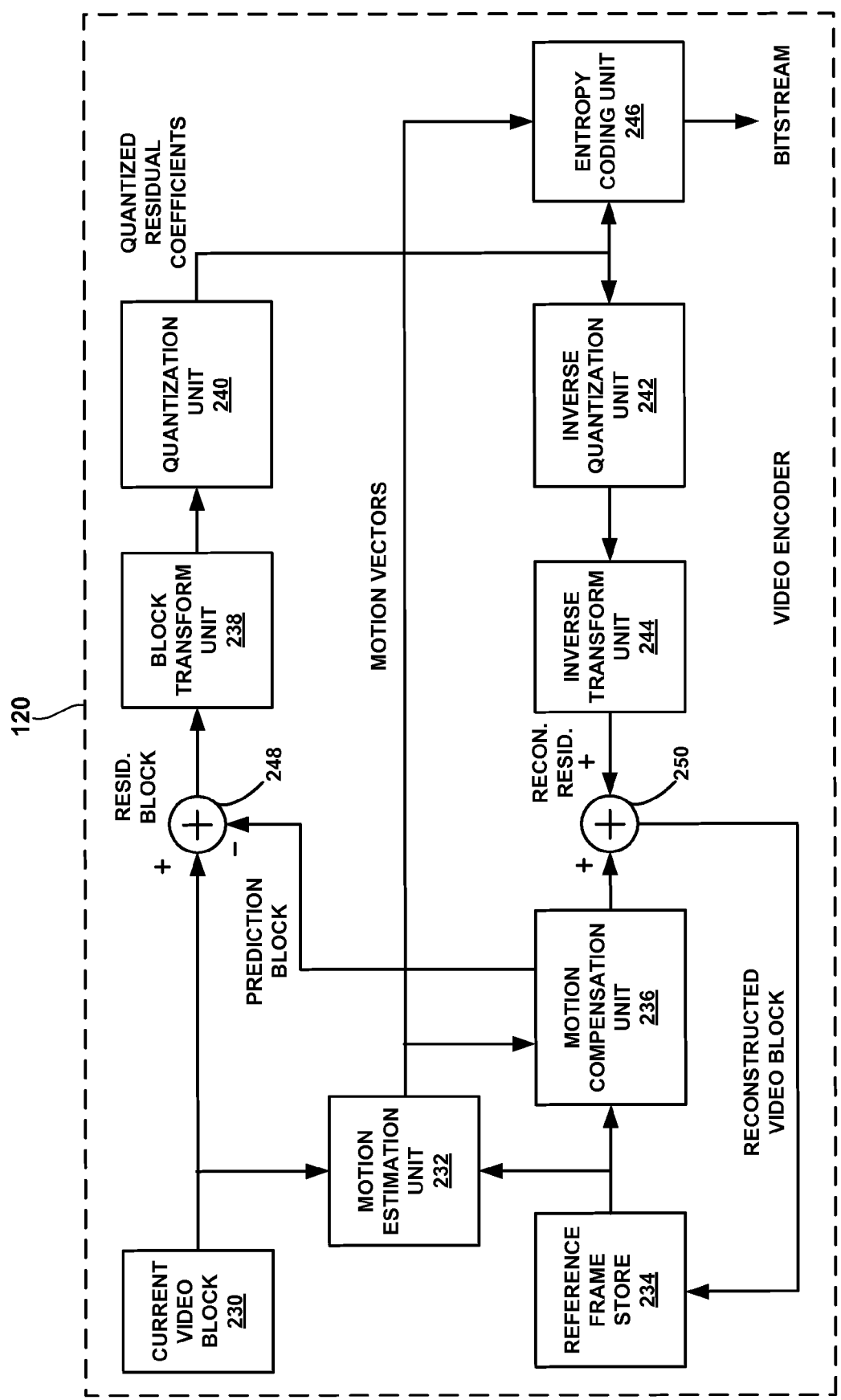
FIG. 2 is a block diagram illustrating an example of the video encoder shown in FIG. 1.

FIG. 2 is a block diagram illustrating an example of a video encoder 120 as shown in FIG. 1. Video encoder 120 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 120 performs motion estimation to track the movement of matching video blocks between adjacent frames.

As shown in FIG. 2, video encoder 120 receives a current video block 230 within a video frame to be encoded. In the example of FIG. 2, video encoder 120 includes motion estimation unit 232, reference frame store 234, motion compensation unit 236, block transform unit 238, quantization unit 240, inverse quantization unit 242, inverse transform unit 244 and entropy coding unit 246. An in-loop deblocking filter (not shown) may be applied to filter blocks to remove blocking artifacts. Video encoder 220 also includes summer 248 and summer 250. FIG. 2 illustrates the temporal prediction components of video encoder 220 for inter-coding of video blocks. Although not shown in FIG. 2 for ease of illustration, video encoder 220 also may include spatial prediction components for intra-coding of some video blocks.

Motion estimation unit 232 compares video block 230 to blocks in one or more adjacent video frames to generate one or more motion vectors. The adjacent frame or frames may be retrieved from reference frame store 234, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 232 identifies one or more blocks in adjacent frames that most closely matches the current video block 230, e.g., based on a rate distortion model, and determines displacement between the blocks in adjacent frames and the current video block. On this basis, motion estimation unit 232 produces one or more motion vectors (MV) that indicate the magnitude and trajectory of the displacement between current video block 230 and one or more matching blocks from the reference frames used to code current video block 230.

Motion vectors may have half- or quarter-pixel precision, or even finer precision, allowing video encoder 120 to track motion with higher precision than integer pixel locations and obtain a better prediction block. When motion vectors with fractional pixel values are used, interpolation operations are carried out in motion compensation unit 236. Motion estimation unit 232 identifies the best block partitions and motion vector or motion vectors for a video block using certain criteria, such as a rate-distortion model. For example, there may be more than motion vector in the case of bi-directional prediction. Using the resulting block partitions and motion vectors, motion compensation unit 236 forms a prediction video block.

Video encoder 120 forms a residual video block by subtracting the prediction video block produced by motion compensation unit 236 from the original, current video block 230 at summer 248. Block transform unit 238 applies a transform, such as the 4×4 or 8×8 integer transform used in H.264/AVC, to the residual block, producing residual transform block coefficients. Quantization unit 240 quantizes the residual transform block coefficients to further reduce bit rate. Entropy coding unit 246 entropy codes the quantized coefficients to even further reduce bit rate.

Entropy coding unit 246 operates as a variable length coding (VLC) unit to apply VLC coding to the quantized block coefficients. In particular, entropy coding unit 246 may be configured to perform VLC coding of digital video block coefficients. In general, video decoder 126 performs inverse operations, including VLC decoding, to decode and reconstruct the encoded video, as will be described, e.g., with reference to FIG. 3.

Inverse quantization unit 242 and inverse transform unit 244 apply inverse quantization and inverse transformation, respectively, to reconstruct the residual block. Summer 250 adds the reconstructed residual block to the motion compensated prediction block produced by motion compensation unit 236 to produce a reconstructed video block for storage in reference frame store 234. The reconstructed video block is used by motion estimation unit 232 and motion compensation unit 236 to encode a block in a subsequent video frame.

Figure 3:
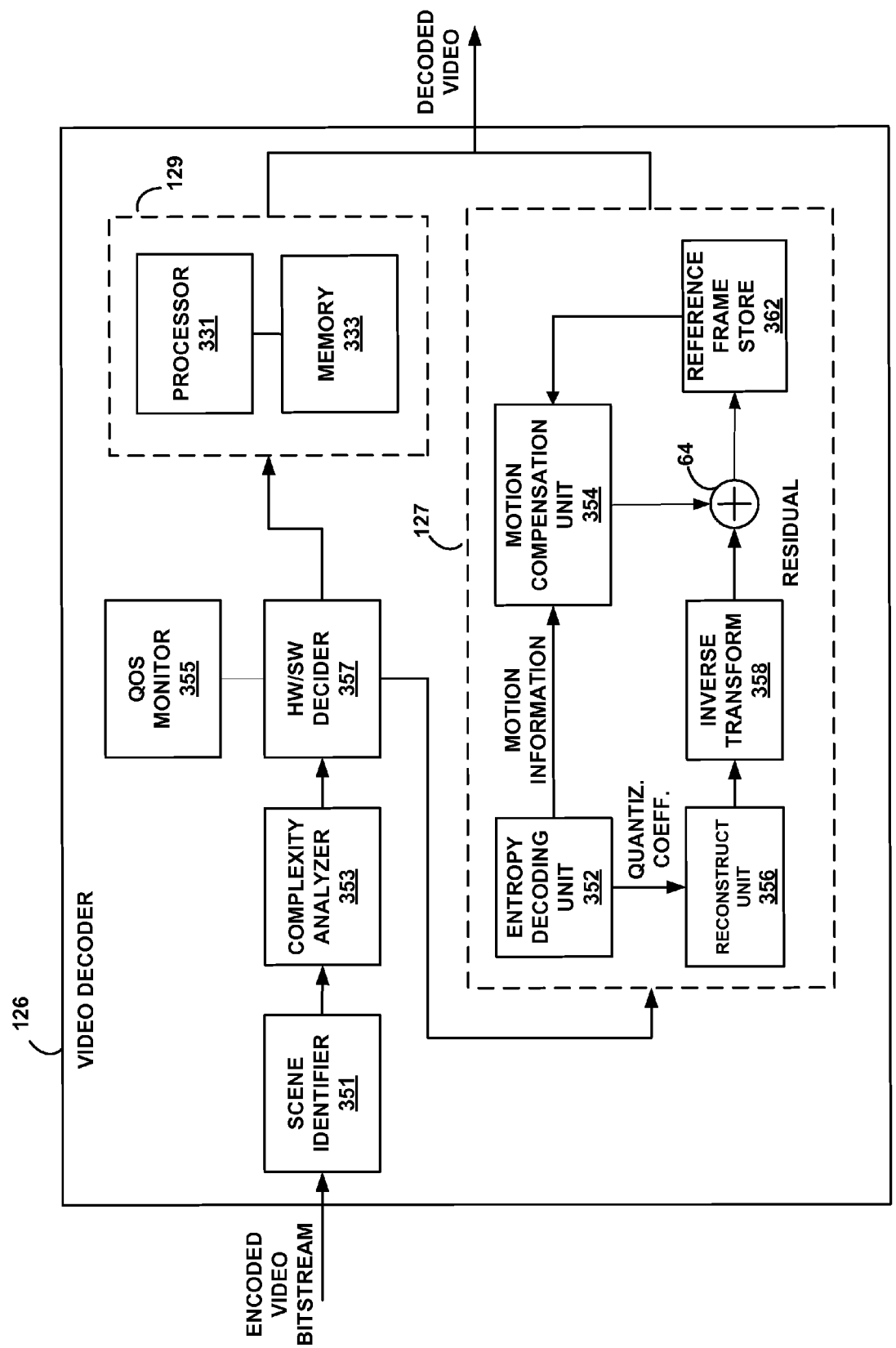
FIG. 3 is a block diagram illustrating an example of the video decoder shown in FIG. 1.

FIG. 3 is a block diagram illustrating an example of a video decoder, such as video decoder 126 of receive device 114 in FIG. 1. Video decoder 126 includes a hardware processing unit 127 (also identified in FIG. 1 as hardware accelerator 127) configured to decode video data and a software decoding module 129 also configured to decode video data. Hardware processing unit 127 includes one or more ASICS, special-purpose processors, graphics processors, FPGAs, or other hardware dedicated to performing specific video decoding operations. Software decoding module 129 comprises one or more software processes being executed by processor 331, which may, for example, be a general purpose processor executing software instructions stored in memory 333. Hardware processing unit may comprise one or more processors separate from processor 331 executing video decoding processes.

As shown in FIG. 3, video decoder 126 receives video data in an encoded video bitstream that has been encoded by video encoder 120. A scene identifying unit 351 identifies a scene within the vide data corresponding to a subset of the video data. A complexity analyzer 353 determines the complexity of the scene. Independent of the scene identifying unit 351 and complexity analyzer 353, quality of service monitoring unit 355 (shown in FIG. 3 as QOS monitor 355) monitors a quality of service for receive device 114 (shown in FIG. 1). QOS monitor 355 may monitor the performance of receive device 114 periodically, aperiodically, or continuously depending on system configuration.

Based on the determined complexity of the scene and the quality determined by the quality of service monitor 355, a hardware/software decider 357 (shown on FIG. 3 as HW/SW decider 357) determines whether to use hardware processing unit 127 to decode the scene or whether to use software decoding module 129 to decode the scene. Hardware/software decider 357 is configured to cause the subset of video data to be decoded using the software decoding module 129 in response to the complexity of the first subset of video data being less than a complexity threshold value and the quality of service being greater than a quality of service threshold value. Hardware/software decider 357 is further configured to cause the subset of video data to be decoded using the hardware processing unit 127 in response to the complexity of the first subset of video data being greater than the complexity threshold value or the quality of service being less than a quality of service threshold value. Aspects of this disclosure include the complexity threshold value and quality of service threshold value utilized by hardware/software decider 357 varying during the course of operation of receive device 114 based on device parameters such as battery power, batter discharge rate, and amount of processing resources dedicated to tasks other than video decoding.

As discussed in more detail above, the complexity threshold value used by hardware/software decider 357 may be based at least in part on the rate at which a battery of the video decoding device is discharging. Also as discussed in more detail above, the complexity of the first subset of video data determined by complexity analyzer 353 may be determined based at least in part on one or more of a bit rate of the first subset of video data, a frame rate of the first subset of video data, a spatial size of the first subset of video data, or a bit stream rate variability of the first subset of video data.

If the complexity of the scene is greater than a complexity threshold value or the quality is less than a quality of service threshold value, then hardware/software decider 357 initiates hardware processing unit 127 to decode the scene. If video decoder 126 is already decoding video using hardware processing unit 127, then video decoder 126 continues using hardware processing unit 127. If, however, the complexity of the scene is less than the complexity threshold value and the quality of service is greater than the quality of service threshold value, then hardware/software decider 357 uses software decoding module 129 to decode the scene.

Hardware processing unit 127 of video decoder 126 may perform intra- and inter-decoding of blocks within video frames. In the example of FIG. 3, hardware processing unit 127 of video decoder 126 includes entropy decoding unit 352, motion compensation unit 354, reconstruction unit 356, inverse transform unit 358, and reference frame store 362. Hardware processing unit 127 may also include an in-loop or post loop deblocking filter (not shown) that filters the output of summer 364. Hardware processing unit 127 may also include summer 364. With in-loop filtering, the filtering of reconstructed video data occurs in the coding loop, which means that the filtered data is stored by for subsequent use in the prediction of subsequent image data. In contrast, with post-loop filtering, the filtering of reconstructed video data occurs out of the coding loop, which means that unfiltered versions of the data are stored for subsequent use in the prediction of subsequent image data. FIG. 3 illustrates the temporal prediction components of video decoder 126 for inter-decoding of video blocks. Although not shown in FIG. 3, video decoder 126 also may include spatial prediction components for intra-decoding of some video blocks.

Entropy decoding unit 352 receives the encoded video bitstream and decodes from the bitstream quantized residual coefficients, macroblock coding mode and motion information, which may include motion vectors and block partitions. Hence, entropy decoding unit 352 functions as a VLC decoding unit. For example, in order to decode quantized residual coefficients from the encoded bitstream, like entropy coding unit 246 of FIG. 2, entropy decoding unit 352 of FIG. 3 may be configured to implement the various aspects of this disclosure. However, entropy decoding unit 352 performs VLC decoding in an inverse manner relative to entropy coding unit 246 of FIG. 2 in order to retrieve quantized block coefficients from the encoded bitstream.

Motion compensation unit 354 receives the motion vectors and block partitions and one or more reconstructed reference frames from reference frame store 362 to produce a prediction video block. Reconstruction unit 356 inverse quantizes, i.e., de-quantizes, the quantized block coefficients. Inverse transform unit 358 applies an inverse transform, e.g., an inverse DCT or an inverse 4×4 or 8×8 integer transform, to the coefficients to produce residual blocks. The prediction video blocks are then summed by summer 364 with the residual blocks to form decoded blocks. A deblocking filter (not shown) may be applied to filter the decoded blocks to remove blocking artifacts. The filtered blocks are then placed in reference frame store 362, which provides reference frame for decoding of subsequent video frames and also produces decoded video to drive display device 128 (FIG. 1).

Software decoding module 129 is configured to perform the same decoding operations described in relation to hardware accelerator 127, but software decoding module 129 does not make use of dedicated hardware. Instead, software decoding module 129 represents software instructions stored in memory 333 being executed by processor 331 to perform video decoding operations. Although FIG. 3 shows processor 331 and memory 333 as part of video decoder 126, processor 331 and memory 333 may not be dedicated to video decoder 126. For example, in a notebook or tablet computer, processor 331 may be the device's general purpose processor, and memory 333 may be the device's RAM. Additionally, the techniques described in this disclosure are not limited to devices with one processor, and therefore, when this disclosure references a processor, it should be recognized that the techniques of this disclosure can also be implemented in systems with multiple processors or multi-core processors.

The particular block-based coding and decoding scheme described in relation to FIGS. 1, 2, and 3 is intended to be just one example of a coding/decoding scheme for which the techniques of this disclosure might be applied. The techniques described in this disclosure can be applied to any video decoding device that makes use of both dedicated hardware and software for performing video decoding operations and is not limited to a particular type of video decoding scheme. For example, techniques of this disclosure can be applied to devices that decode video data coded using FLO standard such as MediaFLO®, a standard from DVB family of standards, a standard from the ATSC family of standards, a standard from the ISDB family of standards, a standard from the MPEG family of standards such as MPEG-2 or MPEG-4 AVC/H.264, or various other standards, including open source standards such as the VP8 standard.

Figure 4:
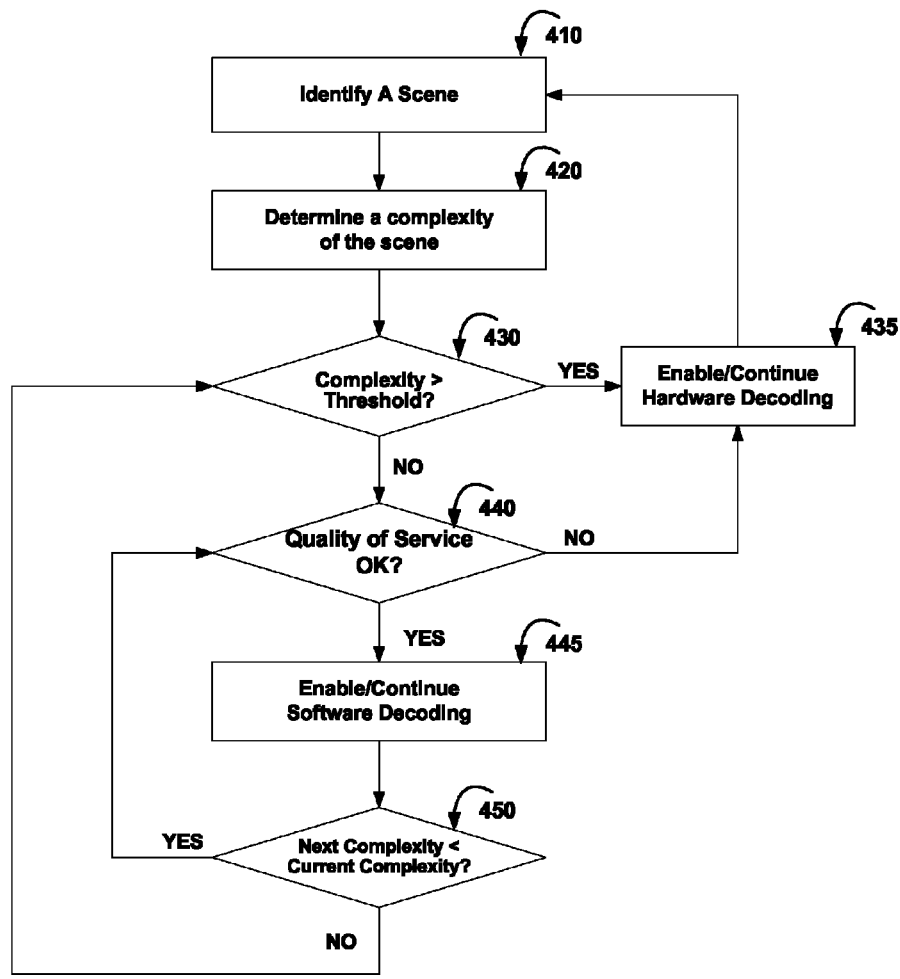
FIG. 4 is a flowchart illustrating aspects of the present disclosure.

FIG. 4 is a flowchart showing aspects of the video decoding techniques described in this disclosure. The techniques of FIG. 4 may, for example, be performed by the devices shown in FIGS. 1, 2, and 3 and will be described in relation to the devices shown in FIGS. 1, 2, and 3. A video decoding device, such as receiving device 114 in FIG. 1, receives an encoded video bit stream, and a scene identifying unit 351 within a video decoder 126 of receive device 114 identifies a scene within the encoded video bit stream (410). For the identified scene, complexity analyzer 353 determines a complexity of the scene (420), and if the complexity of the scene is greater than a complexity threshold value (430, yes), then hardware/software decider 357 enables hardware processing unit 127 to decode the video data, if not currently in use (435). If already in use, video decoder 126 continues using hardware processing unit 127 to decode the incoming video data. If, however, the complexity of the scene is less than the complexity threshold value (430, no) and a measured quality of service for the decoding device is greater than a threshold value (440, yes), then hardware/software decider 357 enables software decoding module 129 to decode video data (445). If the quality of service for the decoding device is not greater than the quality of service threshold value (440, no), then hardware/software decider 357 enables hardware processing unit 127 to decode the video data (435). If already in use, video decoder 126 continues using hardware processing unit 127 to decode incoming video data.

Once software decoding is enabled (445), then software decoding can be continued as long as the complexity of subsequent scenes is less than the complexity of the previous scene (450, yes) and the quality of service remains ok (440, yes). If the complexity of the next scene is greater than the complexity of the previous scene (450, no), then it needs to be determined if the complexity of the next scene is greater than the complexity threshold value (430) before determining if hardware processing unit 127 should be enabled to decode the next scene.

Figure 5:
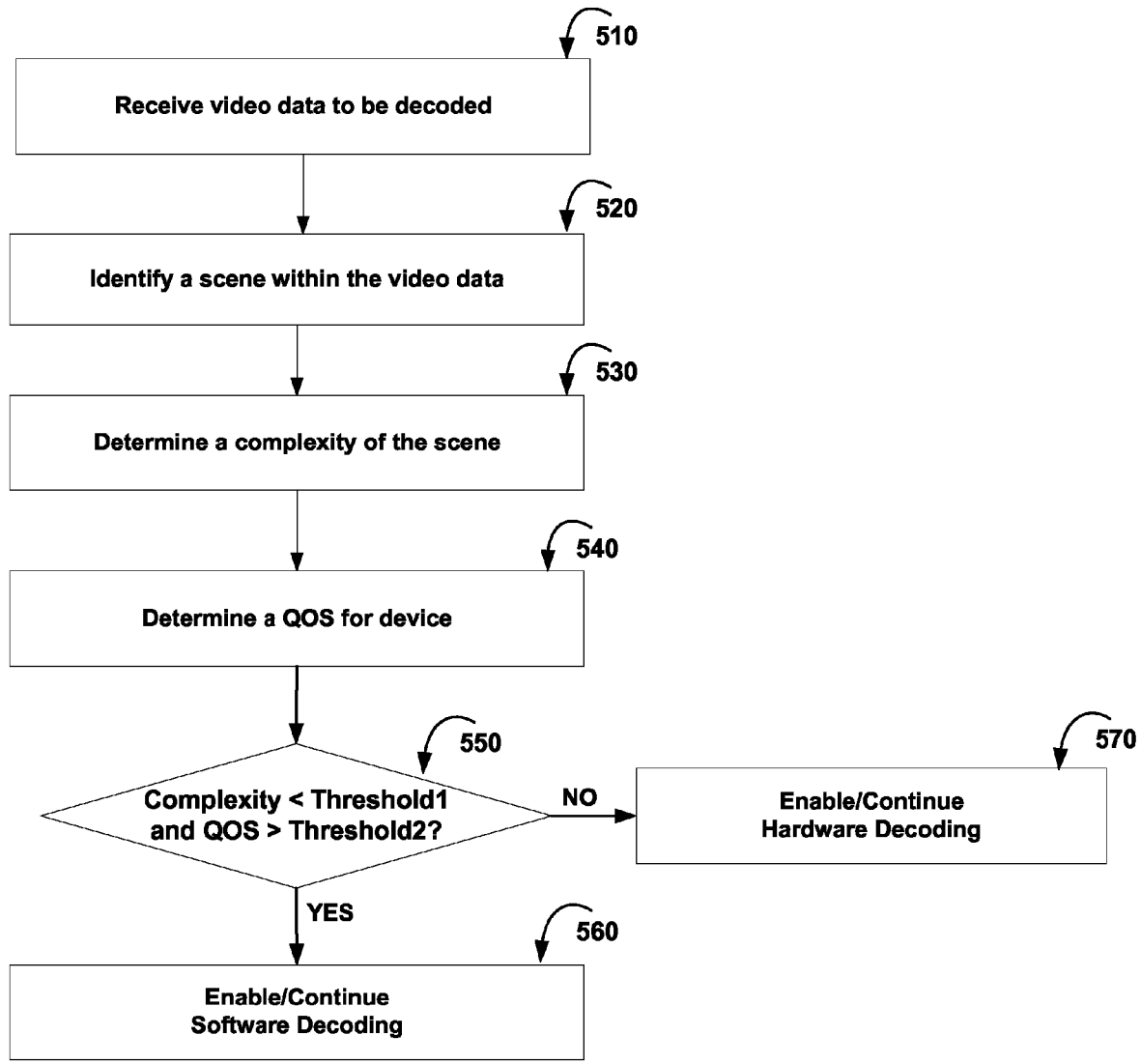
FIG. 5 is a flowchart illustrating aspects of the present disclosure.

FIG. 5 is a flowchart showing a method that implements aspects of the techniques of this disclosure. The techniques of FIG. 5 may, for example, be performed by the devices shown in FIGS. 1, 2, and 3 and will be described in relation to the devices shown in FIGS. 1, 2, and 3 The method includes receiving at a video decoding device, such as receive device 114, video data to be decoded (510). Scene identifying unit 351 of video decoder 126 of receive device 114 identifies within the video data, a first subset of the video data corresponding to a first scene (520). Complexity analyzer 353 determines a complexity of the first subset of video data (530). Quality of service monitor 355 determines a quality of service (QOS) for the video decoding device (e.g. receive device 114) (540). The quality of service may for example, be a measurement of performance of the video decoding device.

Video decoder 126 uses software decoding to decode the first subset of video data (560) in response to the complexity of the first subset of video data being less than a complexity threshold value (shown as Threshold1 on FIG. 5) and the quality of service being greater than a quality of service threshold value (shown as Threshold2 on FIG. 5) (550, yes). Video decoder 126 uses a hardware processing unit to decode the first subset of video data (570) in response to either the complexity of the first subset of video data being greater than the complexity threshold value or the quality of service being less than the quality of service threshold value (550, no).

TABLE 1, below, is an example of pseudo code describing aspects of this disclosure. For purposes of explanation, the pseudo code of TABLE 1 will be described with reference to video decoder 126 of FIG. 3.

TABLE 1

```
1    while (TRUE) {
2         Initialize_Video_Decoder;
3         Identity_Video_Scene;
4         Identify_Video_Scene_Complexity;
5
6         if(Current_Scene_Complexity >
          video_Decode_HW_Accelerator_ComplexityThreshold) {
7              Enable_Video_Decoder_HW_Accelerator;
8         }
9
10        else if(!Video_Decode_QoS_Report) {
11        Enable_SW_Video_Decoder;
12        }
13        else if(Next_Video_Scene_Complexity <
          Current_Video_Scene_Complexity) {
14        Enable_SW_Video_Decoder;
15        }
16        Measure_Video_Decoder_QoS;
17
18        if(Video_Decode_QoS_Report) {
19        if(SW_Video_Decoder_Is_Enabled) {
20        Enable_Video_Decoder_HW_Accelerator;
21             }
22        }
23   }
```

Line 1, which recites "while (TRUE)", initiates a while loop indicating that the operations contained within the while loop will be repeatedly executed. Line 2 of the pseudo code enables or initializes video decoder 126. Line 3 initiates scene identifying unit 351 to identify a scene within video data, and line 4 initiates complexity analyzer 353 to determine a complexity of the scene identified at line 3.

Lines 6-7, 10-11, and 13-14 show three conditional statements and a corresponding action to be taken if the conditional statement is true. The action corresponding to the first conditional statement to be true is performed, and subsequent conditional statements and actions are skipped. Lines 6-7 state that if the complexity that was identified at line 4 of the video scene that was identified at line 3 is greater than a complexity threshold value (conditional statement of line 6), then video decoder 126 is to enable hardware decoding (action of line 7).

If the condition of line 6 is true, then the conditions and actions of lines 10-11 and 13-14 are skipped. The variable "Video_Decode_QoS_Report" represents an unacceptable quality of service for the decoding device, and is therefore true when a measured quality of service is less than a quality of service threshold value. The variable "!Video_Decode_QoS_Report" represents the opposite of "Video_Decode_QoS_Report," which is a not unacceptable (i.e. an acceptable) quality of service for the vide decoding device. "!Video_Decode_QoS_Report" is therefore true when a measured quality of service is greater than a quality of service threshold value. Accordingly, lines 10-11 state that if the quality of service, as measured at line 16, is not unacceptable (conditional statement of line 10), then software decoding is to be enabled (action of line 11).

If either of the conditions of line 6 or 10 are true, then the condition and corresponding action of lines 13 and 14 will be skipped. Otherwise, if the complexity of a future scene is less than the complexity of a current scene (conditional statement of line 13), then software encoding is enabled (action of line 14).

Lines 16-20 serve to verify a decision made at lines 11 or 14 to enable software decoding. If the quality of service measured at line 16 is unacceptable (conditional statement of line 18) and if software decoding is enabled (conditional statement of line 19), then hardware decoding is to be enabled (action of line 19).

For the techniques described in relation to FIGS. 4, 5, and 6 as discussed in more detail above, the complexity threshold value may be based at least in part on the rate at which a battery of the video decoding device is discharging. Also as discussed in more detail above, the complexity of the first subset of video data may be determined based at least in part on one or more of a bit rate of the first subset of video data, a frame rate of the first subset of video data, a spatial size of the first subset of video data, or a bit stream rate variability of the first subset of video data.

The techniques described in this disclosure may be implemented, at least in part, in hardware, software, firmware or any combination thereof. For example, various aspects of the techniques may be implemented within one or more microprocessors, DSPs, ASICs, FPGAs, or any other equivalent integrated or discrete logic circuitry, as well as any combinations of such components, embodied in encoders, laptop, desktop or handheld computers, wireless mobile handsets, set-top boxes, or other devices. The term "processor" or "processing circuitry" may generally refer to any of the foregoing logic circuitry, alone or in combination with other logic circuitry, or any other equivalent circuitry.

Unless explicitly described otherwise, any features described as modules or units may be implemented partially or entirely in an integrated logic device, as discrete but interoperable logic devices, or as one or more software processes. When implemented in software, the functionality ascribed to the systems and devices described in this disclosure may be embodied as instructions on a non-transitory, computer-readable, storage medium such as RAM, SDRAM, ROM, NVRAM, EEPROM, FLASH memory, magnetic media, optical media, or the like. The term "non-transitory" may indicate that the storage medium is not embodied in a carrier wave or a propagated signal. However, the term "non-transitory" should not be interpreted to mean that storage medium is non-movable. As one example, a storage medium may be removed from a device and moved to another device. As another example, a storage medium may be inserted into a device. In certain examples, a non-transitory storage medium may store data that can, over time, change (e.g., in RAM). The instructions may be executed to support one or more aspects of the functionality described in this disclosure.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

Many aspects of the disclosure have been described. Various modifications may be made without departing from the scope of the claims. These and other aspects are within the scope of the following claims.

The invention claimed is:

1. A method comprising;
receiving at a video decoding device, video data to be decoded;
identifying within the video data, a first subset of the video data corresponding to a first scene;
determining a complexity of the first subset of video data;
monitoring a quality of service for the video decoding device;
using software decoding to decode the first subset of video data in response to:
the complexity of the first subset of video data being less than a complexity threshold value; and
the quality of service being greater than a quality of service threshold value;
using a hardware processing unit to decode the first subset of video data in response to:
the complexity of the first subset of video data being greater than the complexity threshold value; or
the quality of service being less than a quality of service threshold value.

2. The method of claim 1, wherein the complexity threshold value is based at least in part on the rate at which a battery of the video decoding device is discharging.

3. The method of claim 1, wherein the complexity of the first subset of video data is determined based at least in part on a bit rate of the first subset of video data.

4. The method of claim 1, wherein the complexity of the first subset of video data is determined based at least in part on a frame rate of the first subset of video data.

5. The method of claim 1, wherein the complexity of the first subset of video data is determined based at least in part on a spatial size of the first subset of video data.

6. The method of claim 1, wherein the complexity of the first subset of video data is determined based at least in part on a bit stream rate variability of the first subset of video data.

7. The method of claim 1, wherein the quality of service is a measurement of performance of the video decoding device.

8. A video decoding apparatus comprising:
a scene identifying unit configured to identify within video data a scene corresponding to a subset of the video data;
a complexity analyzing unit configured to determine a complexity of the scene;
a quality of service monitoring unit configured to monitor a quality of service for the video decoding apparatus;
a software processing module configured to decode the subset of video data;
a hardware processing unit configured to decode the subset of vide data;
a hardware-software decider configured to:
cause the subset of video data to be decoded using the software processing module in response to the complexity of the first subset of video data being less than a complexity threshold value and the quality of service being greater than a quality of service threshold value;
cause the subset of video data to be decoded using the hardware processing unit in response to the complexity of the first subset of video data being greater than the complexity threshold value or the quality of service being less than a quality of service threshold value.

9. The video decoding apparatus of claim 8, wherein the complexity threshold value is based at least in part on the rate at which a battery of the video decoding device is discharging.

10. The video decoding apparatus of claim 8, wherein the complexity of the first subset of video data is determined based at least in part on a bit rate of the first subset of video data.

11. The video decoding apparatus of claim 8, wherein the complexity of the first subset of video data is determined based at least in part on a frame rate of the first subset of video data.

12. The video decoding apparatus of claim 8, wherein the complexity of the first subset of video data is determined based at least in part on a spatial size of the first subset of video data.

13. The video decoding apparatus of claim 8, wherein the complexity of the first subset of video data is determined based at least in part on a bit stream rate variability of the first subset of video data.

14. The video decoding apparatus of claim 8, wherein the quality of service is a measurement of performance of the video decoding device.

15. A non-transitory computer-readable storage medium storing computer executable instructions that upon execution by one or more processors cause the one or more processors to:
receive, at a video decoding device, video data to be decoded;
identify within the video data, a first subset of the video data corresponding to a first scene;
determine a complexity of the first subset of video data;
monitor a quality of service for the video decoding device;
use software decoding to decode the first subset of video data in response to:
the complexity of the first subset of video data being less than a complexity threshold value; and
the quality of service being greater than a quality of service threshold value;
use a hardware processing unit to decode the first subset of video data in response to:
the complexity of the first subset of video data being greater than the complexity threshold value; or
the quality of service being less than a quality of service threshold value.

16. The non-transitory computer-readable storage medium of claim 15, wherein the complexity threshold value is based at least in part on the rate at which a battery of the video decoding device is discharging.

17. The non-transitory computer-readable storage medium of claim 15, wherein the complexity of the first subset of video data is determined based at least in part on a bit rate of the first subset of video data.

18. The non-transitory computer-readable storage medium of claim 15, wherein the complexity of the first subset of video data is determined based at least in part on a frame rate of the first subset of video data.

19. The non-transitory computer-readable storage medium of claim 15, wherein the complexity of the first subset of video data is determined based at least in part on a spatial size of the first subset of video data.

20. The non-transitory computer-readable storage medium of claim 15, wherein the complexity of the first subset of video data is determined based at least in part on a bit stream rate variability of the first subset of video data.

21. The non-transitory computer-readable storage medium of claim 15, wherein the quality of service is a measurement of performance of the video decoding device.

22. A video decoding apparatus comprising:
- means for identifying within video data to be decoded, a first subset of the video data corresponding to a first scene;
- means for determining a complexity of the first subset of video data;
- means for monitoring a quality of service for the video decoding device;
- means for causing software decoding to decode the first subset of video data in response to:
  - the complexity of the first subset of video data being less than a complexity threshold value; and
  - the quality of service being greater than a quality of service threshold value;
- means for causing a hardware processing unit to decode the first subset of video data in response to:
  - the complexity of the first subset of video data being greater than the complexity threshold value; or
  - the quality of service being less than a quality of service threshold value.

23. The video decoding apparatus of claim 22, wherein the complexity threshold value is based at least in part on the rate at which a battery of the video decoding device is discharging.

24. The video decoding apparatus of claim 22, wherein the complexity of the first subset of video data is determined based at least in part on a bit rate of the first subset of video data.

25. The video decoding apparatus of claim 22, wherein the complexity of the first subset of video data is determined based at least in part on a frame rate of the first subset of video data.

26. The video decoding apparatus of claim 22, wherein the complexity of the first subset of video data is determined based at least in part on a spatial size of the first subset of video data.

27. The video decoding apparatus of claim 22, wherein the complexity of the first subset of video data is determined based at least in part on a bit stream rate variability of the first subset of video data.

28. The video decoding apparatus of claim 22, wherein the quality of service is a measurement of performance of the video decoding device.

\* \* \* \* \*